(12) United States Patent
Bismuth et al.

(10) Patent No.: US 11,429,139 B2
(45) Date of Patent: Aug. 30, 2022

(54) SYSTEM AND METHOD FOR GLOBAL SYNCHRONIZATION OF TIME IN A DISTRIBUTED PROCESSING ENVIRONMENT

(71) Applicant: Fermat International, Inc., Palo Alto, CA (US)

(72) Inventors: Robert Bismuth, Seattle, WA (US); Mike Stengle, Seattle, WA (US)

(*) Notice: Subject to any disclaimer, the term of this patent is extended or adjusted under 35 U.S.C. 154(b) by 0 days.

(21) Appl. No.: 17/382,507

(22) Filed: Jul. 22, 2021

(65) Prior Publication Data

US 2022/0050495 A1 Feb. 17, 2022

Related U.S. Application Data

(60) Provisional application No. 63/065,011, filed on Aug. 13, 2020.

(51) Int. Cl.
| | | |
|---|---|---|
| *G06F 1/14* | (2006.01) | |
| *G06F 1/12* | (2006.01) | |
| *H04J 3/06* | (2006.01) | |
| *G06F 1/10* | (2006.01) | |

(52) U.S. Cl.
CPC ............ *G06F 1/12* (2013.01); *G06F 1/10* (2013.01); *G06F 1/14* (2013.01); *H04J 3/0685* (2013.01)

(58) Field of Classification Search
CPC .............. G06F 1/12; G06F 1/10; G06F 1/14
See application file for complete search history.

(56) References Cited

U.S. PATENT DOCUMENTS

| | | | |
|---|---|---|---|
| 6,456,781 B1* | 9/2002 | Rijckaert | G11B 27/3027 |
| 7,242,223 B1* | 7/2007 | Alon | G04D 7/1207 |
| | | | 327/39 |
| 2006/0173952 A1 | 8/2006 | Coyle | |
| 2012/0005517 A1* | 1/2012 | Foster | G06F 1/12 |
| | | | 713/500 |
| 2014/0289533 A1 | 9/2014 | Shah et al. | |
| 2017/0214405 A1* | 7/2017 | Yang | G06F 1/10 |
| 2018/0196142 A1 | 7/2018 | Levy et al. | |
| 2019/0007053 A1* | 1/2019 | Hailu | H03M 9/00 |
| 2019/0187745 A1* | 6/2019 | Murali | G06F 1/14 |
| 2020/0249878 A1 | 8/2020 | Bismuth et al. | |

OTHER PUBLICATIONS

The International Search Report and the Written Opinion of the International searching Authority, or the Declaration for PCT/US2021/0402690, System and Method for Global Synchronization of Time in a Distributed Processing Environment, Fermat International, Inc., dated Nov. 4, 2021.

Mahmood et al. "Clock synchronization over IEEE 802.11—A survey of methodologies and protocols." IEEE Transactions on Industrial Informatics 13.2 (2016): 907-922. Dec. 13, 2016 (Dec. 13, 2016) Retrieved on Sep. 26, 2021 (Sep. 26, 2021).

* cited by examiner

*Primary Examiner* — Phil K Nguyen
(74) *Attorney, Agent, or Firm* — Cozen O'Connor

(57) ABSTRACT

A system and method employing a precisely synchronized time in connection with a distributed hardware architecture are disclosed. Using an independent and trusted time signal and a second transition pulse signal, each resource in the distributed hardware architecture may be synchronized precisely to the same absolute time.

20 Claims, 4 Drawing Sheets

SYSTEM AND METHOD FOR GLOBAL SYNCHRONIZATION OF TIME IN A DISTRIBUTED PROCESSING ENVIRONMENT

CROSS-REFERENCE TO RELATED APPLICATIONS

This application claims the benefit of U.S. provisional patent application Ser. No. 63/065,011, filed Aug. 13, 2020, the disclosure of which is hereby incorporated herein by reference in its entirety.

FIELD OF THE DISCLOSURE

Aspects of the disclosed subject matter relate generally to high performance data processing, and more particularly to a system and method employing a precisely synchronized time system in connection with a distributed hardware architecture.

BACKGROUND

Recently, "Big Data," high performance computing, and solid state device technologies have become increasingly important in many contexts, such as in connection with machine learning and artificial intelligence projects, for instance. With the explosion of data available to such systems (as a result, for example, of the nascent Internet of Things ("IoT"), distributed memory systems, and other processing paradigms involving devices sharing data with other devices), the sheer volume of available data to process is increasing faster than traditional hardware and software systems are able to evolve in order to process those data in a meaningful and efficient manner.

Further, most conventional systems designed for high throughput data processing and analytics rely upon exhaustive (or "brute force") approaches that attempt to overpower the magnitude of the challenge with overwhelming computational resources, at the expense of cycle time and power consumption. As a practical matter, it will be appreciated that for as long as the rate at which new data become available for processing continues to outpace the rate at which processing methodologies advance to accommodate the increased size of a given dataset, it will continue to take longer to solve bigger and more complex data processing problems—or solutions providers will continue to throw more resources at those problems.

Therefore, there is a need for an improved system and method employing a precisely synchronized time in connection with a distributed hardware architecture for resource-intensive applications; as set forth below, some implementations of such a precisely synchronized time may be configured and operative to leverage external signals received from an independent trusted source that may be used as "global" or "universal" time across all compute nodes or other processing resources.

SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the disclosed subject matter in a simplified form as a prelude to the more detailed description that is presented later.

The present disclosure describes a system and method employing a precisely synchronized time in connection with a distributed hardware architecture; in the context of this description, a discrete component of such a distributed hardware architecture is generally referred to as a "compute node," though other terms may be used by those of skill in the art. In some implementations, one or more compute nodes may be utilized to manage and to execute data processing operations independent of, though communicatively coupled with, a host compute system. Using the system and methodologies set forth below, each compute node, and optionally, the host compute system as well, may be synchronized precisely. Those of skill in the art will appreciate that distributed processing operations may benefit from precise time across a multiplicity of processing resources.

In accordance with one aspect of the disclosed subject matter, a method of generating a local event timestamp having a precise time may generally comprise: identifying a precision oscillator signal and using the precision oscillator signal to clock a local real time clock counter with sufficient range to represent an absolute time; identifying a trusted time signal and a pulse per second signal; employing the trusted time signal to load the local real time clock counter with the absolute time; employing the pulse per second signal to synchronize a second transition of the local real time clock counter and to reset a high resolution counter running at a local system clock frequency; and generating a local event timestamp with a resolution of a local system clock period using the absolute time and a high resolution local offset responsive to the employing the pulse per second signal.

Methods are disclosed wherein the using the precision oscillator signal comprises utilizing a local oscillator to produce a local clock signal at the local system clock frequency. In some implementations, the identifying a trusted time signal and a pulse per second signal comprises identifying a satellite signal; such as a global positioning system signal.

Methods are disclosed wherein the identifying a trusted time signal and a pulse per second signal comprises utilizing a timing input/output interface to receive a precision clock signal comprising the trusted time signal and the pulse per second signal.

In some implementations, the generating a local event timestamp comprises modifying an indication of the absolute time output from the local real time clock counter by the high resolution local offset output from the high resolution counter. In some methods, the generating a local event timestamp comprises producing timestamp data comprising a 64 bit value.

In accordance with another aspect of the disclosed subject matter, a system utilizing precise time signals may generally comprise: a timing input/output interface to receive a time signal and a pulse per second signal; a local real time clock counter with sufficient range to represent an absolute time, wherein the local real time clock counter is initiated with an absolute time from the time signal and synchronized with the pulse per second signal; and a high resolution counter running at a local system clock frequency, wherein the high resolution counter is synchronized with the pulse per second signal; wherein output from the local real time clock counter and the high resolution counter are combined to generate a precision timestamp for local system events.

Systems are disclosed further comprising a local oscillator to produce a local clock signal at the local system clock frequency; in some such systems, the local oscillator is an oven controlled crystal oscillator.

Additionally, some systems are disclosed wherein the time signal and the pulse per second signal are derived from a satellite signal, such as a global positioning system signal. In some such systems, the timing input/output interface comprises a wireless receiver.

In some systems, the timestamp comprises an indication of the absolute time output from the local real time clock counter modified by a precision offset value output from the high resolution counter. The timestamp may comprise a 64 bit value.

In accordance with still another aspect of the disclosed subject matter, a system utilizing precise time signals may generally comprise: a timing input/output interface to receive a time signal and a pulse per second signal; a local real time clock counter initiated with an absolute time from the time signal and synchronized with the pulse per second signal; and a high resolution counter synchronized with the pulse per second signal; wherein an indication of the absolute time output from said local real time clock counter is modified by an offset output by said high resolution counter to generate a timestamp for local system events.

Systems are disclosed further comprising a local oscillator to produce a local clock signal at a local system clock frequency. In some systems, the high resolution counter is clocked at the local system clock frequency; alternatively, in other implementations, the high resolution counter is clocked faster than the local system clock frequency.

As noted above, the timing input/output interface may comprise a wireless receiver to receive a wireless signal comprising the time signal and the pulse per second signal, and the timestamp may comprise a 64 bit value.

The foregoing and other aspects of various disclosed embodiments will be apparent through examination of the following detailed description thereof in conjunction with the accompanying drawing figures, in which like reference numerals are used to represent like components throughout, unless otherwise noted.

DESCRIPTION OF THE DRAWING FIGURES

DETAILED DESCRIPTION

Figure 1:
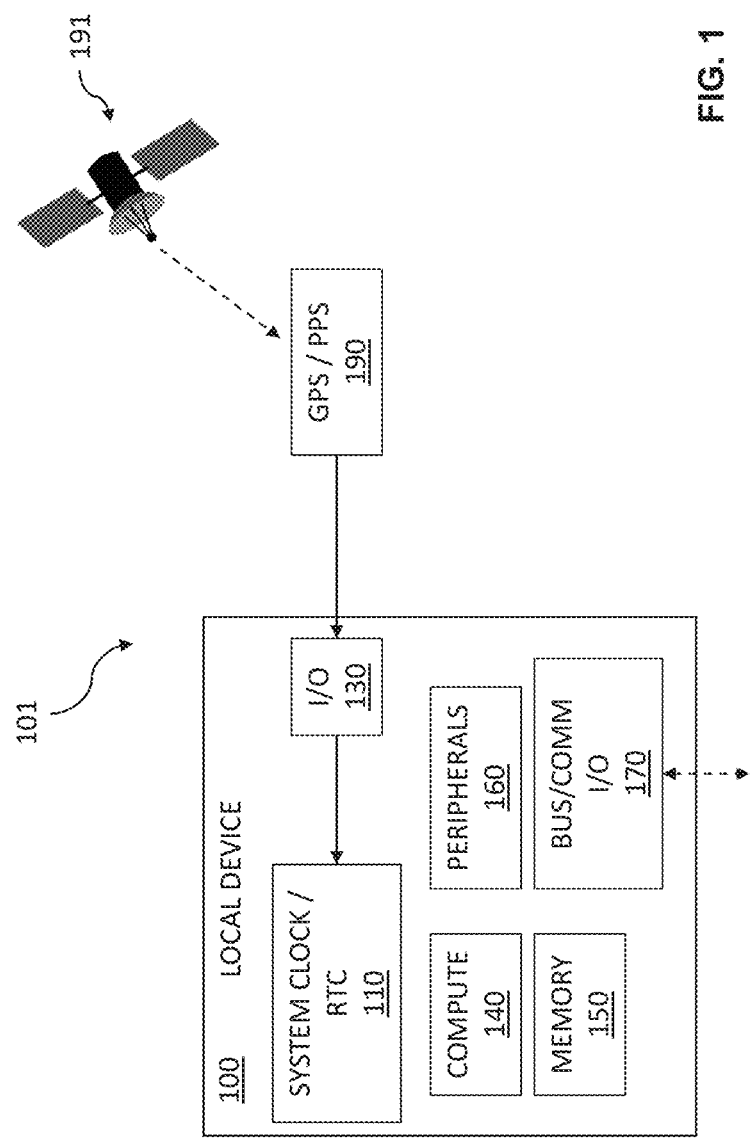
FIG. 1 is a functional block diagram illustrating one implementation of a precision time system for use in connection with a processing resource.

Certain aspects and features of the disclosed subject matter may be further understood with reference to the following description and the appended drawing figures. In operation, a system and method employing time that is precisely synchronized across independent processing resources may have utility in connection with various data processing strategies and data analytics implementations. Specifically, the present disclosure provides for a distributed data processing platform that may generally comprise hardware and software, all operating on precisely synchronized, or "absolute," time.

It will be appreciated by those of skill in the art that a reliable clock across multiple (say, eight or more, in some implementations) compute nodes or processing resources is a significant technical challenge. Increasingly, processing intensive compute operations rely upon very precise timing with small margins for error. For example, a system designer or operator may have a need or desire to compare log file data available from each of the nodes or resources, and since each is independent (or "self-contained"), the lack of a universal, absolute, or precisely synchronized clock can make the order of events difficult to ascertain. In this context and others, the disclosed subject matter may provide the same normalized, universal, global, or absolute time timestamp, not only across the nodes in a single module or device, but also across the nodes of multiple modules in the same server, in the same datacenter, or even across data centers.

In the context of this disclosure, the terms "normalized," "universal," "global," and "absolute" time are intended to mean that the clocks for multiple processing resources are, for all practical purposes as set forth below, precisely synchronized to a sufficient degree that a high-precision local offset is enough to establish (or additionally or alternatively to govern, control, or otherwise to regulate) a sequence of events across the multiple processing resources within a margin of error that is satisfactory to the system designer. In that sense, those of skill in the art will appreciate that the concept of "absolute" time may be application-specific, depending upon, for example, the precision of the processing resources and the intricacies of the processing operations, local clock frequencies, temperature variations, or a combination of these and a variety of other factors.

In use, a system and method for global synchronization of time described below may provide a known absolute time—irrespective of location in the distributed environment—that is accessible to hardware and software applications, algorithms, or other processing operations (for instance, through an application programming interface (API) or other mechanism). It will be appreciated that this absolute time is independent of local server time or network time skew. Accordingly, system operators or application programmers may precisely track when a given interaction with a processing resource, or a particular processing resource within a particular module or other device, took place—read, write, run algorithm, get results, and/or other system events may be monitored, or even controlled, in absolute time that is precisely synchronized across all hardware and software resources in a distributed processing architecture.

Implementation of precisely synchronized time across distributed processing nodes has utility in a variety of use cases, such as, but not limited to cyber intrusion detection involving seeking and identifying patterns of activity in application-provided datasets which may exist in multiple, discrete datacenters, but are time series related. As another example, it may be beneficial to synchronize a time series database in applications involving distributed collection of data and subsequent distributed processing of the data.

As set forth in more detail below, the present disclosure addresses enabling absolute or universal time across such distributed processing architectures. The architectural framework generally contemplates one or multiple compute nodes operating in parallel (and in series, in some cases), each of which may be configured as a pipeline of computational elements that can be configured and operative to implement a variety of algorithms or other data processing operations. In the configurations provided as examples, each processing resource has a local real time clock counter that may be influenced by and synchronized to a trusted external timing signal received from an independent source.

Turning now to the drawing figures, FIG. 1 is a functional block diagram illustrating one implementation of a precision time system for use in connection with a processing resource. As illustrated, one implementation of system 101 may generally comprise a compute system or processing resource (i.e., local device 100) and a source 190 of a timing signal.

Device 100 may generally be embodied in or comprise a computer server, a desktop or workstation computer, a laptop or portable computer or tablet, or a combination of one or more of such components. In operation, device 100 may be employed to initiate, instantiate, or otherwise to effectuate data processing operations as is generally known in the art. In that regard, device 100 may include one or more microprocessors, field programmable gate arrays (FPGAs), microcontrollers, or other digital processing apparatus (reference numeral 140), along with attendant memory (reference numeral 150), controllers and firmware (not illustrated in FIG. 1 for clarity), network interface hardware (reference numeral 170), and the like. For example, device 100 may generally comprise multiprocessor systems, microprocessor-based or programmable consumer electronics, personal computers ("PCs"), networked PCs, minicomputers, mainframe computers, and similar or comparable apparatus for general purpose or application-specific data processing. Various implementations of device 100 may be deployed in distributed computing environments in accordance with which tasks or program modules may be performed or executed by remote processing devices, which may be linked through a communications network. Those of skill in the art will appreciate that any of various computer servers, work stations, or other processing hardware components or systems of components may be suitable for implementation at device 100, and that the disclosed subject matter is not limited to any particular hardware implementation or system architecture employed at device 100.

In the FIG. 1 example, device 100 is illustrated as comprising a compute component 140, memory 150, peripherals 160, and network interface hardware (or input/output (I/O) interface) 170. Specifically, with respect to requesting, initiating, enabling, facilitating, and receiving results of any data processing operations, device 100 may be communicatively coupled to routers, bridges, communications channels, or other networked devices, such as via a bus or communications hardware represented by I/O interface 170. In operation, I/O interface 170 generally enables bi-directional data transmission in accordance with any of various communications interfaces or telecommunications protocols generally known in the art or developed and operative in accordance with known principles, and generally supports the use of device 100 in a distributing processing architecture.

Compute component 140 may generally comprise one or more microprocessors, FPGAs, application specific integrated circuits (ASICs), programmable logic blocks, microcontrollers, or other digital processing apparatus suitable for data processing in accordance with requirements or design specifications of device 100. Typically, compute component 140 cooperates with or operates in connection with memory 150, which may generally comprise or have access to, by way of example, volatile memory such as random access memory (RAM) in any of its various forms, for instance, static RAM (SRAM), dynamic RAM (DRAM), double-data rate (DDR) RAM, and the like; in some applications, DDR4 RAM may be used as or in connection with memory 150. Additionally or alternatively, memory 150 may be embodied in or generally comprise a mass data storage component, such as a non-volatile data storage device, one example of which is an Electronically Erasable Programmable Read Only Memory (EEPROM) store. For example, memory 150 may be, or include, Flash memory, though other memory types having suitable or appropriate characteristics to facilitate the functionality of device 100 may be in use currently or developed in the future. Specifically, any of various types of processing hardware and firmware, as well as volatile and non-volatile storage media, may have utility in the context of operation of device 100 (which may be application- or system-specific), and the present disclosure is not intended to be limited by the nature or operational characteristics of memory 150 or of compute component 140.

Similarly, device 100 may include or have access to functional characteristics of any of a number of peripherals 160, such as hardware or firmware modules, external components, and the like, that generally support or enable operation of compute component 140 in cooperation with memory 150. Typical peripherals 160 include monitors or displays, keyboards, trackpads, or other input devices, external memory stores such as disk drives or removable storage media, or other components as are generally known in the art. Peripherals 160 are typically connected via bus structures or I/O hardware, which are not illustrated in FIG. 1 for clarity. Those of skill in the art will appreciate that the present disclosure contemplates any of myriad peripherals 160 that support or enable operation of compute component 140 in the context of desired or required operation of device 100.

Figure 2:
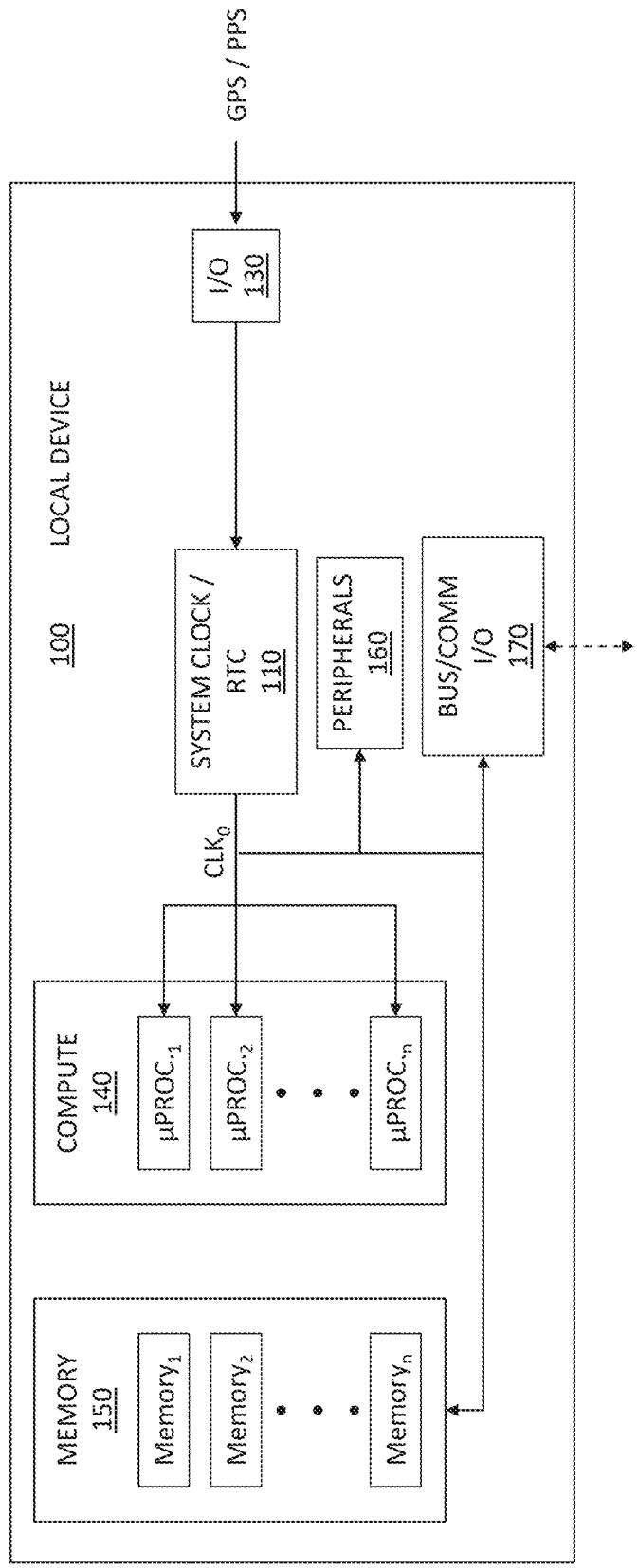
FIG. 2 is a functional block diagram illustrating one implementation of a processing resource using one system for precision time.

Device 100 also comprises a system clock 110, which generally governs timing of events executing at device 100, as well as timing for operation of the constituent components of device 100 (as best illustrated in FIG. 2 and addressed in more detail below).

As illustrated in FIG. 1, device also includes a timing I/O interface 130. In operation, timing I/O interface 130 may generally receive a signal from source 190 and subsequently communicate that signal (either directly or indirectly via appropriate signaling hardware) to system clock 110. In some implementations, timing I/O interface 130 may be embodied in or comprise suitable wireless hardware to receive a signal from source 190 wirelessly; in these instances, any of various wireless communications protocols and hardware infrastructure may be utilized. For example, timing I/O interface 130 may be configured and operative in accordance with wireless local area network (LAN) technologies such as the 802 standard promulgated by the Institute of Electrical and Electronics Engineers (IEEE), e.g., IEEE 802.11 or Ethernet, IEEE 802.3. Additionally or alternatively, timing I/O interface 130 may include a physical or structural connector or connection mechanism, such as a network interface card, hardware component, or communications port, jack, or plug, such as are generally known in the art or to be developed in accordance with known principles. It will be appreciated that the implementation of timing I/O interface 130 may depend upon the hardware or operational characteristics of source 190 and the manner in which source 190 provides the timing signal (e.g., wirelessly or wired).

In operation, source 190 provides an independent (i.e., external to, and not dependent upon operation of, device 100) trusted timing signal to timing I/O interface 130.

Source 190 may be implemented as or generally comprise a source for global positioning system (GPS) timing signals, such as those received from a GPS satellite 191. It is noted that FIG. 1 is stylized, and that additional satellites are omitted for clarity. In some implementations, for instance, where timing I/O interface 130 comprises suitable receiver functionality, timing I/O interface 130 may receive timing signals directly from satellite 191, or from multiple such satellites as is generally known in the satellite positioning or navigation art. In other implementations, satellite 191, or a combination of such satellites, may transmit timing signals to an intermediary system or hardware structure, which then may relay such timing signals to timing I/O interface 130. In FIG. 1, source 190 is intended to depict both of the foregoing embodiments, and generally to represent a trusted source of an independent timing signal. In the illustration, that signal is a GPS signal, but other timing signals are also contemplated, such as from other global navigation satellite systems (GNSSs) such as Russia's Global Navigation Satellite System (GLONASS), China's BeiDou Navigation Satellite System (BDS), and Europe's Galileo system. Those of skill in the art will appreciate that satellite technology is not necessary for suitable implementation of source 190, and that other universal or precision clocks (such as the one maintained by the National Institute of Standards and Technology (NIST)) may be used for source 190 in some applications.

FIG. 2 is a functional block diagram illustrating one implementation of a processing resource using a system for precision time. In that regard, FIG. 2 is a more detailed view of the device 100 illustrated in FIG. 1, showing a local system clock signal, $CLK_0$, distributed by system clock 110. As noted above, system clock 110 generally governs timing for operation of all of the constituent components of device 100.

Of interest in FIG. 2 is that compute component 140 and memory 150 are illustrated as having multiple sub-components. For instance, compute component 140 may comprise a plurality of processing sub-components such as microprocessors $\mu PROC._1$, $\mu PROC._2$, . . . $\mu PROC._n$, each of which may be embodied in or comprise one or more of the processing hardware technologies set forth above. Similarly, memory 150 may comprise a plurality of memory stores such as $Memory_1$, $Memory_2$, . . . $Memory_n$, each of which may be embodied in one or more of the memory types discussed above and may generally be operative to store data and instructions necessary or desirable for compute component 140 to perform write/read/execute operations in support of device 100 functionality as is generally known. Busses, communication pathways, controllers and other supporting hardware, etc. have been omitted from FIG. 2 for clarity.

As illustrated in FIG. 2, and as is generally known in the art, system clock 110 may distribute $CLK_0$ to peripherals 160, I/O interface 170, compute component 140 (and its constituent sub-components), and memory 150 (and its constituent sub-components). In a departure from conventional hardware architectures, however, system clock 110 may be informed by an external timing signal provided by source 190, such as via timing I/O interface 130, as set forth in more detail below.

Figure 3:
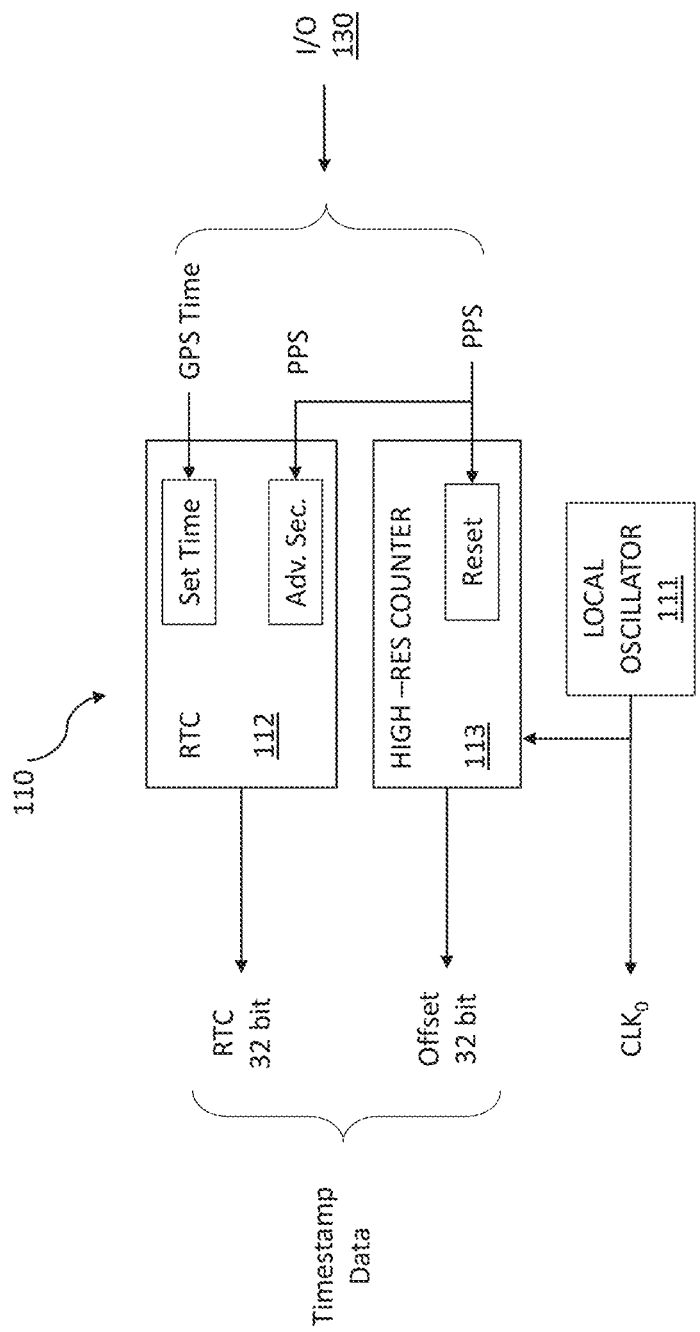
FIG. 3 is a functional block diagram illustrating one implementation of a system clock for use in connection with a processing resource.

In that regard, FIG. 3 is a functional block diagram illustrating one implementation of a system clock for use in connection with a processing resource. In the FIG. 3 example, system clock 110 is illustrated as generally comprising a real time clock counter (RTC 112), a high-resolution counter 113, and a local oscillator 111 that serves as a source for $CLK_0$. As is typical in many applications, local oscillator 111 may be embodied in or generally comprise a precision oscillator suitable for high-speed data processing applications or otherwise for the design specifications of device 100; an oven controlled crystal oscillator (OCXO) is one example, though the present disclosure is not intended to be limited by the nature or the operational characteristics of the oscillator used by or in local oscillator 111. In operation, local oscillator 111, irrespective of its type or specific implementation, may be utilized to produce and to distribute a clocking signal at a predetermined or a selectively controlled frequency—for example, the frequency output by a typical OCXO may be temperature-dependent, and so precise control of temperature may allow for fine adjustments in frequency of $CLK_0$ output from local oscillator 111.

In some implementations, counter 113 may be configured and operative to run at $CLK_0$, as illustrated, but other clock frequencies, typically higher than $CLK_0$, may be appropriate for some applications. In operation, counter 113 may be used to provide high-resolution clock timing, at $CLK_0$, for example, synchronized each second with the trusted external clock signal from source 190 substantially as set forth below. Any of numerous counter hardware components or technologies generally known in the art may be suitable for implementation as counter 113.

In the FIG. 3 example, timing I/O interface 130 may receive both a GPS signal and a pulse per second (PPS) signal (e.g., from source 190), and may subsequently supply those signals to system clock 110. Specifically, a PPS signal may be provided (i.e., at a frequency of 1 Hz) to counter 113 such that counter 113 may be reset at regular 1 second intervals in synchronization with the signal provided by source 190 via timing I/O interface 130. Similarly, a PPS signal may also be provided to RTC 112 such that a second counter at RTC 112 may be advanced in synchronicity with the signal provided by source 190 via timing I/O interface 130; this feature allows RTC 112 to maintain local time consistent with the trusted timing signal provided by source 190. Specifically, RTC 112 may set local time according to the GPS signal, and the PPS signal may be used to ensure that the second transitions in RTC 112 occur precisely at the second transitions of the GPS signal.

In summary, RTC 112 may set local time as a function of a GPS signal, and may periodically synchronize an output RTC signal using pulses in the PPS signal; counter 113 may similarly be synchronized to the pulses in the PPS signal such that an offset between $CLK_0$ and the PPS signal may be determined. RTC 112 may then output an RTC signal (for example, a 32-bit output signal) representative of real time, and counter 113 may output an offset signal (for example, a 32-bit output signal), both of which may be employed to create a timestamp for a given system event occurring in device 100. Those of skill in the art will appreciate that the RTC and offset signals may comprise more or fewer than 32 bits, and that the nature and bandwidth of these signals may be application-specific or otherwise dependent upon the operational specifications or requirements of device 100 or of the distributed system of which it is a part.

As noted above with reference to FIG. 1, other types of trusted, independent timing signals (i.e., other than GPS) may be used for driving the synchronization illustrated in FIG. 3. Any signal with a trusted time and an accurate second transition pulse may be used with similar effect.

Figure 4:
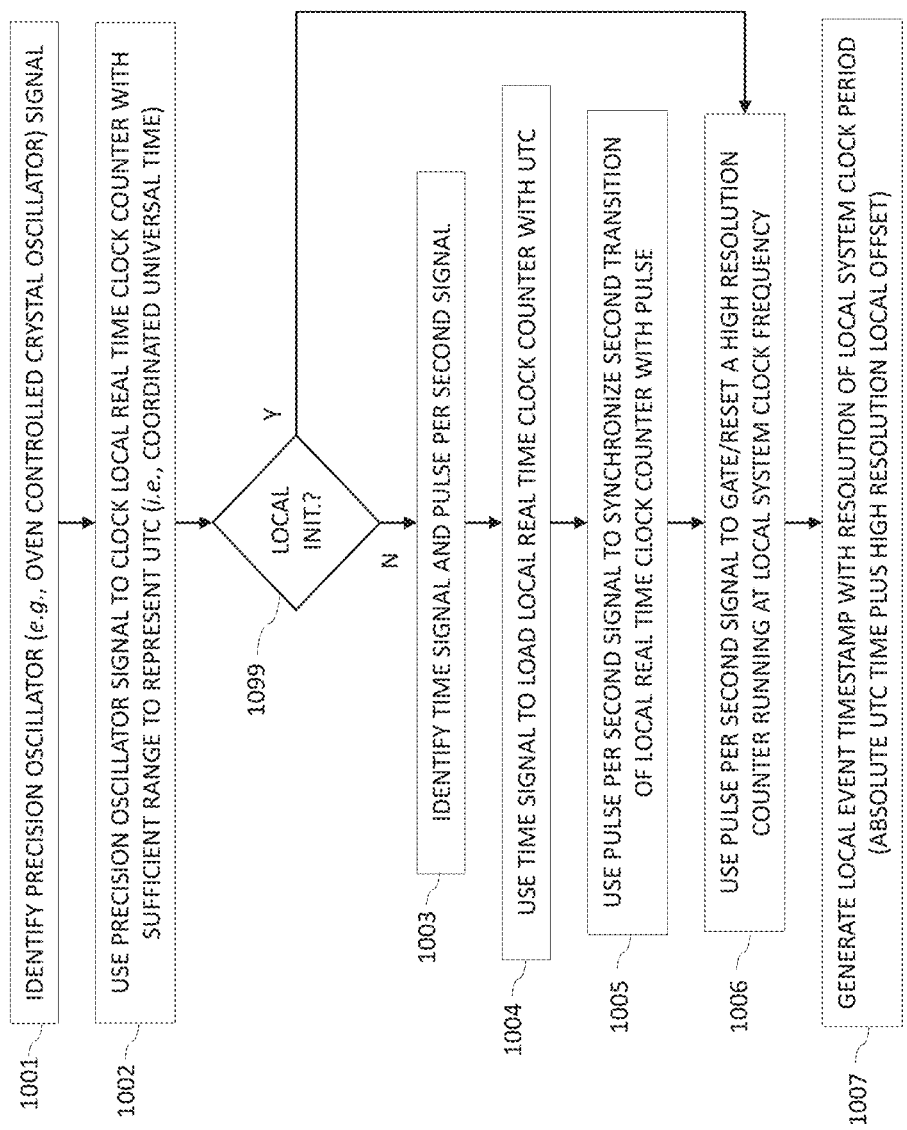
FIG. 4 is a flow diagram illustrating aspects of one implementation of a method of generating a local event timestamp having a precise time.

FIG. 4 is a flow diagram illustrating aspects of one implementation of a method of generating a local event timestamp having a precise time. At block 1001, the method may begin by identifying a precision oscillator signal; in some implementations, this signal may be identified from local oscillator 111 in FIG. 3, for instance, though other embodiments are contemplated. For example, the oscillator signal may be embedded in the trusted, independent timing signal received from source 190 via timing I/O interface 130, or via another mechanism. As indicated at block 1002, the precision oscillator signal may be used to clock a local real time clock counter with sufficient range to represent an absolute or global time. As set forth above, the GPS signal (or other signal from source 190) may provide a numeric value or other timing indicum to initiate RTC 112 in FIG. 3. In that regard, at block 1003, the method may continue by identifying a trusted time signal and a pulse per second signal; as noted above, one example of this functionality includes receipt of a GPS signal and a PPS signal from source 190. It is noted that blocks 1002 and 1003 may be combined or executed substantially concomitantly, depending upon the nature of the signal received from source 190 and the manner in which the real time clock counter is initiated. For example, if the precision oscillator signal in blocks 1001 and 1002 is embedded in the trusted time signal, then the operation at block 1002 may be completed by identifying the trusted time signal in block 1003. In the example of FIG. 4, the process may not proceed to block 1003 until a determination is made at decision block 1099 that the local real time clock counter (e.g., RTC 112) has been initiated, though this determination may be incorporated into the operations at blocks 1002, 1003, or both in some applications. Those of skill in the art will appreciate that other alternatives exist that are within the scope and contemplation of the present disclosure.

As indicated at block 1004 the trusted time signal may be employed to load a local real time clock counter with absolute time; an example of this is illustrated at the top of FIG. 3, in which the GPS time signal is input to the Set Time block in RTC 112, though times other than GPS time may also be used. As indicated at blocks 1005 and 1006, the method may proceed by employing the pulse per second signal to synchronize a second transition of the local real time clock counter (e.g., RTC 112) and to reset a high resolution counter running (e.g., counter 113) at a local system clock frequency (i.e., $CLK_0$); examples of these operations are illustrated in the middle of FIG. 3. It is noted that the operations illustrated in blocks 1005 and 1006 may be reversed in order or combined without any practical effect. The order of these operations is presented only for visualization purposes; in practice, these operations are happening simultaneously, as both are occurring in synchronicity with the PPS signal in FIG. 3. Those of skill in the art will appreciate that the foregoing subject matter is susceptible of various design choices that may influence the order or arrangement of some or most of the operations depicted in FIG. 4.

Finally, at block 1007, the method may conclude by generating a local event timestamp with a resolution of a local system clock period using the absolute time (e.g., output from RTC 112) and a high resolution local offset generated (e.g., by counter 113) responsive to the pulse per second signal.

In summary, the method makes use of a trusted, independent time signal and a trusted PPS signal. In operation, the time signal may provide a numeric value to initiate and/or to set absolute time in RTC 112, and the PPS may be used to increment the second count in RTC 112, and also to reset high-speed counter 113 that provides a precision offset since the last second increment. Output from RTC 112 combined with an offset value output from counter 113 may be used as "timestamp data," which may be employed either independently or in conjunction with other system data to create a precision (e.g., 64 bit) timestamp for local system events.

Several features and aspects of a system and method have been illustrated and described in detail with reference to particular embodiments by way of example only, and not by way of limitation. Those of skill in the art will appreciate that alternative implementations and various modifications to the disclosed subject matter are within the scope and contemplation of the present disclosure. Therefore, it is intended that the present disclosure be considered as limited only by the scope of the appended claims.

What is claimed is:

1. A method of generating a local event timestamp having a precise time; said method comprising:
   identifying a precision oscillator signal and using the precision oscillator signal to clock a local real time clock counter with sufficient range to represent an absolute time;
   identifying a trusted time signal and a pulse per second signal;
   employing the trusted time signal to load the local real time clock counter with the absolute time;
   employing the pulse per second signal to synchronize a second transition of the local real time clock counter and to reset a high resolution counter running at a local system clock frequency; and
   generating a local event timestamp with a resolution of a local system clock period using the absolute time and a high resolution local offset responsive to said employing the pulse per second signal.

2. The method of claim 1 wherein said using the precision oscillator signal comprises utilizing a local oscillator to produce a local clock signal at the local system clock frequency.

3. The method of claim 1 wherein said identifying a trusted time signal and a pulse per second signal comprises identifying a satellite signal.

4. The method of claim 3 wherein the satellite signal comprises a global positioning system signal.

5. The method of claim 1 wherein said identifying a trusted time signal and a pulse per second signal comprises utilizing a timing input/output interface to receive a precision clock signal comprising the trusted time signal and the pulse per second signal.

6. The method of claim 1 wherein said generating a local event timestamp comprises modifying an indication of the absolute time output from the local real time clock counter by the high resolution local offset output from the high resolution counter.

7. The method of claim 1 wherein said generating a local event timestamp comprises producing timestamp data comprising a 64 bit value.

8. A system utilizing precise time signals; said system comprising:
   a timing input/output interface to receive a time signal and a pulse per second signal;
   a local real time clock counter with sufficient range to represent an absolute time, wherein said local real time clock counter is initiated with the absolute time from the time signal and synchronized with the pulse per second signal; and
   a high resolution counter running at a local system clock frequency, wherein said high resolution counter is synchronized with the pulse per second signal;
   wherein output from said local real time clock counter and said high resolution counter are combined to generate a precision timestamp for local system events.

9. The system of claim 8 further comprising a local oscillator to produce a local clock signal at the local system clock frequency.

10. The system of claim 9 wherein said local oscillator is an oven controlled crystal oscillator.

11. The system of claim 8 wherein the time signal and the pulse per second signal are derived from a satellite signal.

12. The system of claim 11 wherein the satellite signal is a global positioning system signal.

13. The system of claim 11 wherein the timing input/output interface comprises a wireless receiver.

14. The system of claim 8 wherein the timestamp comprises an indication of the absolute time output from the local real time clock counter modified by a precision offset value output from the high resolution counter.

15. The system of claim 8 wherein the timestamp comprises a 64 bit value.

16. A system utilizing precise time signals; said system comprising:
    a timing input/output interface to receive a time signal and a pulse per second signal;
    a local real time clock counter initiated with an absolute time from the time signal and synchronized with the pulse per second signal; and
    a high resolution counter synchronized with the pulse per second signal;
    wherein an indication of the absolute time output from said local real time clock counter is modified by an offset output by said high resolution counter to generate a timestamp for local system events.

17. The system of claim 16 further comprising a local oscillator to produce a local clock signal at a local system clock frequency, and wherein said high resolution counter is clocked at the local system clock frequency.

18. The system of claim 16 further comprising a local oscillator to produce a local clock signal at a local system clock frequency, and wherein said high resolution counter is clocked faster than the local system clock frequency.

19. The system of claim 16 wherein said timing input/output interface comprises a wireless receiver to receive a wireless signal comprising the time signal and the pulse per second signal.

20. The system of claim 16 wherein the timestamp comprises a 64 bit value.

\* \* \* \* \*